United States Patent Office 3,453,301
Patented July 1, 1969

3,453,301
**TRIS-BETAHYDROXYETHYL PHOSPHONO-
METHYLENE AMMONIUM COMPOUNDS**
Eugene H. Uhing, Ridgewood, N.J., assignor to Stauffer
Chemical Company, New York, N.Y., a corporation of
Delaware
No Drawing. Filed Nov. 21, 1966, Ser. No. 595,589
Int. Cl. C07f 15/02, 9/38, 9/02
U.S. Cl. 260—439                               6 Claims

ABSTRACT OF THE DISCLOSURE

The present invention is directed to tris-beta-hydroxyethyl phosphonomethylene ammonium compounds of the general formula:

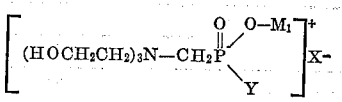

wherein X is a monovalent anion such as hydroxy or halogen; $M_1$ represents hydrogen and radicals which form salts therewith; and Y is a substituent selected from the group consisting of hydrogen, alkyl, aryl and —O—$M_2$ wherein $M_2$ represents hydrogen and radicals which form metal salts therewith. These compounds are useful as sequestering agents and to prevent iron chlorosis in plants.

---

The present invention relates to novel compounds, salts thereof and chelates of the same wherein said compounds and salts have the general formula:

I.

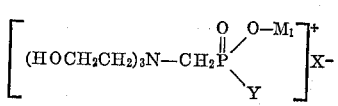

wherein X is a monovalent anion such as $OH^-$, $F^-$, $Cl^-$, $Br^-$, $I^-$; $M_1$ represents hydrogen and radicals which form salts therewith, such as exemplified by metal cations; and Y is a substituent selected from the group consisting of hydrogen, alkyl, aryl and —O—$M_2$ wherein $M_2$ represents hydrogen and radicals which form metal salts therewith. These compounds are useful as sequestering agents and to prevent iron chlorosis in plants.

Compounds of the type set forth herein may be formed in accordance with the method disclosed in U.S. patent application to Uhing filed concurrently herewith. The method set forth therein for preparing the compounds of the present invention comprises reacting triethanol amine with neutralized halomethylphosphonic acids and halomethylphosphinic acids under elevated temperature according to the following general type reaction.

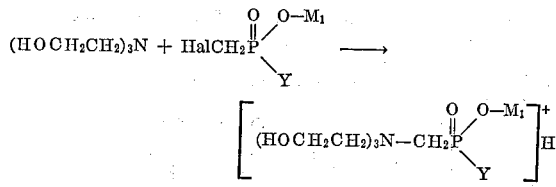

wherein the groups are the same as listed hereinbefore. The reaction is preferably carried out at temperatures of at least 100° C. and more preferably at higher temperatures in the range of 120°–160° C. The temperature necessary for optimum reaction conditions may vary depending on the specific phosphonic acid or phosphinic acid chosen for reaction and this variant may be determined by experimentation.

The triethanol amine compound must be present in the reaction mixture in a chemically unbound form at reaction temperature to effect reaction. Due to the presence of acidic moieties on the phosphorus acid, the triethanol amine is preferentially attracted toward these sites and becomes effectively tied up by this attraction. Effective product formation is not accomplished until the acid is in some way neutralized so that the triethanol amine can be present in the reaction mixture in a free chemically unbound form. The preferred method of accomplishing this result is the use of an excess of triethanol amine, e.g., a quantity sufficient to neutralize the phosphorus acid plus a sufficient quantity to react with the neutralized acid to form the desired product. In the case of phosphonic acid, three moles of triethanol amine per mole of acid reactant are preferred to obtain effective high yields and two in the case of phosphinic acid. The acid groups can also be neutralized by other means such as by reaction with sodium hydroxide, or by esterification though these are less preferred. A combination of the two means can also be used such as by forming the half ester of the phosphonic acid and utilizing the triethanol amine to neutralize the remaining acidic moiety. The amount of triethanol amine required to effect reaction of the neutralized acid reactant can be any amount though a slight molar excess is preferred so as to obtain the product in high yield.

The reaction between the triethanol amine compound and the halomethylphosphonic or halomethylphosphinic acid is generally a liquid phase reaction. The preferred reactants among the acids are those which are liquid at room temperature or which become liquid within the reaction temperature range.

Solid reactants, such as, chloromethylphosphonic acid and bromomethylphosphonic acid, can be melted and then dissolved in the triethanol amine or mixed directly and then heated. The preferred solvent and neutralizing agent is an excess of the reacting amine. Addition of other solvents can vary depending on the solvolysis action of a particular material and on reaction conditions, such as temperature. Preferably, the solvent should have a reflux temperature at normal atmospheric pressure within the preferred reaction temperature range. Illustrative of various inert solvents and diluents are water, butanol, hexanol and the like. Inert solvents and diluents may also be added to liquid reaction mixtures to control rate of reaction if desired. Preferably, an excess of the triethanol amine is utilized as diluent though this is not a requirement.

The reaction is generally conducted at atmospheric pressure though lesser and greater pressures may be utilized if desired.

The reaction proceeds at a fairly rapid rate to provide an adequate yield of product. It is preferred, however, that the reaction mixture be maintained under reaction conditions for at least about 4 hours to insure completeness of reaction. Effective reaction time will vary somewhat depending on the reactive nature of the initial starting materials and the reaction conditions, and this can be easily determined by experimentation.

As would also be apparent, reaction aids such as catalyst can also be utilized. Also, the use of other techniques for effecting the contact of the reactants, such as incremental addition of one reactant to the other may also be employed if desired.

The reaction of the triethanol amine and the halomethylphosphonic or halomethylphosphinic acid provides a product of the type which is set forth in Formula I wherein X is halogen. The halogen anion can be replaced by a hydroxyl group by reacting the halogen salt with a basic agent, such as silver oxide.

The alkali metal salts of the prepared compounds can also be formed by treating the prepared compounds with an alkali metal hydroxide, such as sodium hydroxide. This salt formation procedure can be effectively used for purification of the compounds following reaction. In such treatment, the groups heretofore identified as $M_1$ and $M_2$, which are hydrogen in the hydroxyl form, are replaced by alkali metal groups, e.g., Na+.

The halomethylphosphonic or halomethylphosphinic acid reactant material has a halogen substituent on the alkyl radical which can be fluorine, chlorine, bromine, or iodine; chlorine being preferred.

The phosphorus acid base of the reactant is a phosphonic acid or a phosphinic acid. The term phosphonic acid is intended to include compounds of the formula:

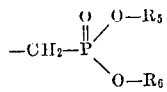

wherein $R_5$ and $R_6$ are hydrogen, alkyl, aryl, or metal salts thereof. Thus, the term phosphonic acid includes not only phosphonic acid, e.g., wherein $R_5$ and $R_6$ are hydrogen, but also substituted phosphonic acids. The term phosphinic acid is intended to include compounds of the formula:

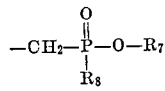

wherein $R_7$ is the same as $R_5$, and $R_8$ is hydrogen, alkyl or aryl. As with the phosphonic acid, the term phosphinic acid also includes substituted phosphinic acid derivatives.

Suitable compounds useable to prepare the compounds of the present invention are halomethylphosphonic acids, halomethylphosphinic acids, and derivatives thereof. These compounds may be illustrated by chloromethylphosphonic acid, bromomethylphosphonic acid, and other halomethylphosphonic acids and salts thereof; chloromethylphosphinic acid, methyl chloromethylphosphinic acid, bromomethylphosphinic acid, and other halomethylphospinic acids and salts thereof.

The following example illustrates the preparation of the product:

EXAMPLE 223 parts of weight of triethanol amine was added to 39 parts by weight of chloromethylphosphonic acid and heated with agitation under a nitrogen blanket at 130° C. for 4 hours. The temperature was then increased to 140° C. for 8 hours. 45 grams of triethanol amine was added to the reaction mixture and the heating was continued for four hours at 140° C. The product of this reaction was extracted by adding one liter of acetone to the reaction mixture wherein two layers developed, one a syrup layer of product, the other an acetone layer containing excess triethanol amine. The acetone layer was separated, evaporated and the remainder was reextracted with 500 milliliters of a 1/1 ether/acetone mixture to obtain any residual product which was carried over in the separation. The product from the syrup layer was extracted by admixing the syrup with ethanol and separating the resulting coagulant (semi-solid mass weighing approximately 200 grams). This mass was reextracted to obtain approximately 146 grams of product. The product was dissolved in water and 0.14 mole of silver oxide ($Ag_2O$) was added to effect removal of ionic chloride. The silver chloride precipitate was then filtered off and the filtrate evaporated to give 132 grams of product. To effect final purification, the sodium salt was formed by dissolving the product in water and adding 16.8 grams of sodium hydroxide to the solution. The solution was then evaporated to dryness and the solids were washed in 200 milliliters of ethanol. 13 grams of product was obtained after filtration which analyzed as follows:

|  | Percent | | | |
| --- | --- | --- | --- | --- |
|  | P | N | Na | Cl |
| Theoretical [1] | 10.2 | 4.6 | 15.1 | 0 |
| Actual | 11.2 | 6.2 | 16.6 | 0 |

[1] Based on assumed compound (MW 305).
Tris-betahydroxyethyl (disodium phosphonomethylene) ammonium hydroxide

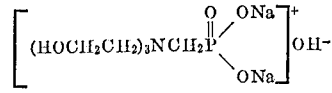

The filtrate was reextracted with acetone and 58 grams of product were obtained which analyzed as follows:

|  | Percent | | | |
| --- | --- | --- | --- | --- |
|  | P | N | Na | Cl |
| Theoretical [2] | 11.6 | 5.25 | 8.8 | 0 |
| Actual | 10 | 6.2 | 10 | 0 |

[2] Based on assumed compound (MW 266).
Tris-betahydroxyethyl (monosodium phosphonomethylene) ammonium inner salt

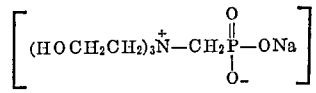

Other phosphonic and phosphinic acids, such as those illustrated hereinbefore can also be used in the procedure set forth in the above illustrative example to provide the corresponding triethanol amine derivatives of the acids.

The compounds of the present invention show an ability to form chelates with multivalent metal ions in solution. Thus, these chelating materials may be used to sequester many multivalent metal ions in combination with detergents as well as in dyeing processes wherein the sequestering of multivalent metal ions is desirable. These chelates show the ability to remain stable in solution at quite high pH's. The chelate of ferric iron was found capable of providing iron for the greening of chlorotic plants, such as beans attempting to grow in calcareous, chlorosis-producing soil.

Thus, the triethanol amine N-methylphosphonic acids and phosphinic acids of the present invention are highly useful compounds in that they are capable of forming water soluble chelates with a number of multivalent metallic ions. The ferric-iron chelate is stable in acidic, neutral and alkaline solutions.

Soil applications of the ferric chelates are useful for supplying iron to chlorotic plants growing in alkaline, calcareous soil and of greening the plants.

The foregoing detailed description has been given for clearness of understanding only, and no unnecessary limitations should be understood therefrom, as modifications will be obvious to those skilled in the art.

What is claimed is:

1. A compound of the formula:

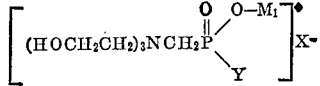

wherein X is halogen or hydroxyl, Y is a substituent selected from the group consisting of hydrogen, methyl, and —O—$M_2$, and $M_1$ and $M_2$ are members selected from the group consisting of hydrogen and alkali metal ions.

2. A compound as recited in claim 1 wherein X is halogen.

3. A compound as recited in claim 1 wherein X is hydroxyl.

4. A compound as recited in claim 1 wherein Y is O—$M_2$.

5. A compound as recited in claim 4 wherein $M_1$ and $M_2$ are hydrogen.

6. A water soluble chelate comprising a compound of claim 1 and ferric iron ion.

References Cited

UNITED STATES PATENTS

| | | | |
|---|---|---|---|
| 2,774,786 | 12/1956 | Erickson | 260—945 |
| 2,847,442 | 8/1958 | Sallmann | 260—945 |
| 2,917,528 | 12/1959 | Ramsey et al. | 260—439 |

OTHER REFERENCES

Medred et al.: "Chem. Abstracts," vol. 46 (1952), pp. 7996, 7997.

BERNARD HELFIN, *Primary Examiner.*

J. E. EVANS, *Assistant Examiner.*

U.S. Cl. X.R.

71—2.3; 252—152; 260—501.12, 501.19, 502.5, 945